Patented Apr. 25, 1944

2,347,225

UNITED STATES PATENT OFFICE 2,347,225

ZIRCONIUM OXIDE REFRACTORY AND METHOD OF MAKING THE SAME

Eugene Wainer, Niagara Falls, N. Y., assignor to The Titanium Alloy Manufacturing Company, New York, N. Y., a corporation of Maine No Drawing. Application January 19, 1942, Serial No. 427,281

9 Claims. (Cl. 106—57)

This invention relates to zirconium oxide or zirconia refractories and the method of making the same.

In the field of special refractory materials, zirconium dioxide has long been of primary interest for several reasons, such as its extremely high melting point (approximately 2750° C.) and its chemical inertness in the presence of fluid slags of widely different chemical nature. Refractory masses of this material may be formed by a number of procedures, such as pressing, ramming, soft mud molding, cement casting, jiggering, slip casting, etc. Of these, by far the most satisfactory for the fabrication of special shapes is the slip casting procedure, and the most useful for high speed production of hollow ware is the jiggering process. Large structures of simple design or any size piece of intricate convolution and design are not suited to pressure methods of formation, due to the cost of forms or dies required, and the extreme difficulty, if not impossibility, of maintenance of uniform structure. Some shapes are of such complexity, due to the presence of aprons, grooves, undercuts, varying cross sections, etc., as to make the proper engagement of pressure dies a commercial impossibility. Therefore, in the fabrication of ceramic or refractory pieces such as thin walled crucibles, hollow ware generally and the like, recourse is invariably had to casting or molding a plastic mass in a suitable mold, by methods known to the ceramist as "slip casting" and "jiggering." In slip casting, a water slip of the ceramic material is prepared and cast into plaster of Paris molds of accurate design. Much of the water is extracted by the porous plaster, the residual material being poured out, leaving a damp shell of ceramic material in the mold. This damp material continues to dry further, shrinking slightly from the plaster surface, thus allowing easy removal of the shape from the mold. Complex pieces up to several hundred pounds in weight of highly uniform and compact structure can thus be made. In jiggering, a mud of proper qualities is formed against a revolving plaster mold by means of a tool stationary in one plane. The chief difference between slip casting and jiggering is in the amount of water and consequently the consistency of the masses used, jiggering masses being stiff muds and casting masses being pourable fluids. In either case, the mass must have highly specialized properties usually denoted by the ceramic terms "deflocculation" (applied to slip casting) or "plasticity" (applied to jiggering).

Zirconium dioxide of the type suitable for ceramic structures is completely non-plastic and is therefore not deflocculated when mixed with water. In my copending application Serial No. 330,373, one method of imparting plasticity to zirconia slips and its various modifications was described, involving the use of certain phosphates to accomplish this purpose. I have now discovered still other novel means of imparting the necessary plasticity to zirconia materials, so that it can be formed by slip casting or jiggering procedures.

The present invention generally comprises forming a plastic slip or jiggering mass containing principally zirconium oxide with a limited amount of water, together with very small amounts of a water-dispersible colloid and a water-soluble monohydroxyl base or material forming a monohydroxyl base in water solution.

The practice of this invention is particularly advantageous because it enables pourable slips or jiggering masses to be obtained from zirconium oxide (a normally non-plastic material) without the addition of plastic inorganic materials which detract from the refractoriness of the product. As zirconium oxide is one of the most refractory materials known, and is also unique in its relative chemical inertness at high temperatures, it is seen that the permanent incorporation of materials which detract from these characteristics is undesirable. Consequently, it is preferred in the practice of this invention to employ relatively pure zirconium oxide as the starting material. Although auxiliary bonding agents and other materials of high melting point may be added, it is generally preferred that, if used at all, only small quantities be used. Accordingly, it is preferred that the total quantity of refractory oxides (e. g. melting at above 2000° F.), or compounds of such refractory oxides, such as silicates, or other refractory materials, such as carbides, other than zirconium oxide, present as impurities in the zirconium oxide or water or otherwise added, should not exceed 5 per cent of the zirconium oxide. For certain purposes, as disclosed in copending application Serial No. 427,282 filed of even date herewith, small quantities of silica or silica containing compounds may be added. Materials containing large quantities of high-melting bonding agents, or impure natural baddeleyite, may be used, but are considerably less satisfactory.

The most suitable type of zirconium oxide for use in this invention is that known as electrically fused zirconia. However, other types of zirconia may be used, such as zirconium oxide formed by the calcination of hydrates, carbonates, chlorides, sulfates, oxysulfates, nitrates, etc. When these materials are calcined to at least 2400° F. and preferably to 2600° F., they are suitable for use in the present invention. Impure natural zirconia such as baddeleyite may also be used, after crushing to the proper particle size.

For best results, the particle sizes of the zirconium dioxide are of importance. Thus, for forming very tight thin-walled structures, a mixture of minus 200 mesh material and minus 325 mesh material may be used, the preferred proportions being 65% minus 200 mesh plus 325 mesh and 35% minus 325 mesh. For more massive structures, coarser grain sizes should be used, and the following is preferred: 60 to 70 parts minus 40 plus 100 mesh, 30 to 40 parts minus 100 plus 200 mesh, 10 to 20 parts minus 200 mesh plus 325 mesh, and 5 to 10 parts minus 325 mesh material.

The colloids suitable for use in this invention are those forming true sols in pure water or in other words colloids which are more or less completely dispersible or peptizable in pure water. Generally, these materials include gels and gel forming materials, and are further characterized by slow diffusibility in water. They are usually non-crystalline or sometimes gelatinous, have huge apparent molecular weights of such size as to be ultramicroscopically visible, and are non-electrolytes. Further, the colloids must be either neutral, or only very slightly basic or acid in the hydro dispersed form. They may be either organic or inorganic, but the organic materials are preferred. While these materials are generally characterized by the term "colloidal" and its usual connotations, the determining factor for utility in the present invention is apparently the huge true or apparent molecular weight of these substances in water, so that truly water soluble materials of huge molecular weight are also contemplated. Since water solutions of such materials normally exhibit properties shown by colloidal systems generally, the distinction is immaterial for the present purpose.

Some of the colloidal materials of the above type which may be used are as follows: corn starch, root starch, starches generally, dextrin, albumin, serum albumin, blood serum, tannins, tannic acid, gelatine, glue, agar agar, alginic acid, kelp extracts, humus and compost extracts, extracts of decayed leaves, some proteins, molasses, gums such as arabic and tragacanth, pectins, glycogens, and others. Inorganic sols of a colloidal nature are not preferred since in their preparation some electrolyte is normally used for peptization purposes. This electrolyte must be completely removed before the colloid may be mixed with the other ingredients of the composition, since the electrolytes normally used for such purposes have a tendency to counteract or nullify the deflocculating effect of the colloid and base.

In addition to the water dispersible colloid, a small amount of a water soluble monohydroxyl base or material forming a monohydroxyl base in aqueous solution must be incorporated in the mixture. Both these materials (colloid and base) must be used together, as the presence of one alone, even in larger quantity, is insufficient to produce a pourable slip which can be dried and fired to suitable refractory shapes. The base and the quantity thereof must be such that its dissociation constant in water, at a concentration of 0.5% or less, is at least $1.0 \times 10^{-6}$. Such bases are the alkali metal hydroxides, ammonium hydroxides, certain simple and substituted alkyl amines which may be primary, secondary, or tertiary or mixed, the substituted amines known as "onium" or "oxonium" compounds, such as ethyl or methyl ammonium hydroxide, and certain heterocyclic aromatic compounds such as piperidine. Polyhydroxyl bases are completely unsuitable for this purpose.

When it is desired to make a suitable refractory shape by slip casting or jiggering procedures, it is of course necessary to add a suitable quantity of water, to impart fluidity to the zirconium oxide composition. From a practical standpoint, it may often be desired to ship dry ingredients to the fabricator of refractory shapes, so that all the latter need do is add the proper amount of water, mix, place in the mold, dry and fire. In this case, both the water-dispersible colloid and the monohydroxyl base will be mixed in the dry state with the zirconium oxide, and water later added. The base used for dry compositions should be non-hygroscopic, so that the mass can be easily handled and shipped, and for this purpose the organic bases are the most suitable.

However, if the composition is to be made and the refractory shape fabricated at the same place, the monohydroxyl base may be incorporated as an aqueous solution, or the water-dispersible colloid as an aqueous dispersion, or both. In this case, the inorganic bases, particularly caustic soda, are preferred because of their inexpensiveness. In either case, a completely deflocculated slip or jiggering mass is obtained, suitable for slip casting or jiggering in plaster molds. As stated above, zirconium oxide constitutes the major portion of the composition. It has been found that the amount of water should generally not exceed 17 per cent of the amount of zirconium oxide, and that the most suitable amount depends upon the particle sizes of the zirconium oxide, the uses to which it is to be put, and the method of forming into the required shape, that is, whether by the slip casting or jiggering process. Thus, for slip casting the more finely divided mixtures, more water is required than for the coarser mixtures, while about 20 per cent less water is required for jiggering the same mixtures. When the amount of water is allowed to fall below about 8 per cent of the zirconium oxide, it has generally been found that the mixture is not sufficiently fluid or plastic for slip casting or jiggering.

The amounts of the water dispersible colloid and monohydroxyl base must be kept within relatively narrow ranges, and 0.002 to 0.5 per cent of each based on the weight of the zirconium oxide has been found suitable. Furthermore, by varying the absolute amount of these materials and the amounts relative to each other, slips and jiggering masses with widely varying characteristics over the usable range may be prepared. For example, the higher the amount of the combined colloid and base relative to the zirconium oxide up to their limits, the thinner the final wall section that may be prepared. By decreasing the base to its lower limit and maintaining the colloid at a median amount, heavier wall sections can be formed. By decreasing the colloidal material in amount towards its lower limit, and maintaining the base at a median amount, rapidly formed pieces of heavy cross section and relatively lower density can be obtained.

The invention having been described generally, the following examples are given of specific modes of practicing the same:

Example 1

The following ingredients are thoroughly mixed together:

| | | |
|---|---|---|
| —200 mesh electrically fused $ZrO_2$ | grams | 650 |
| —325 mesh electrically fused $ZrO_2$ | do | 350 |
| Water | cc | 140 |
| NaOH | grams | 0.1 |
| Tannin | do | 0.1 |

The mixture is poured or slip cast into plaster molds, dried and fired.

Example 2

The same procedure is followed as in Example 1, except that only 110 cc. of water are used. The material is jiggered on plaster molds, dried and fired.

Example 3

The following ingredients are thoroughly mixed together:

| | | |
|---|---|---|
| —40 +80 mesh electrically fused $ZrO_2$ | grams | 650 |
| —100 +200 mesh electrically fused $ZrO_2$ | grams | 350 |
| —200 mesh electrically fused $ZrO_2$ | do | 150 |
| —325 mesh electrically fused $ZrO_2$ | do | 80 |
| Water | cc | 117 |
| NaOH | grams | 0.1 |
| Tannin | do | 0.1 |

The mixture is poured or slip cast into plaster molds, dried and fired.

Example 4

The same procedure is followed as in Example 1, except that only 95 cc. of water are used. The material is jiggered on plaster molds, dried and fired.

When parts or percentages are mentioned, parts and percentages by weight are understood. In addition, where the term "monohydroxyl base" is used, this is understood to include substances which form a monohydroxyl base in aqueous solution. Where the term "refractory oxides other than zirconium oxide" is used, this is understood to include such refractory oxides whether combined or uncombined with other oxides.

As many variations are possible within the scope of this invention, it is not intended to be limited except as defined by the appended claims.

I claim:

1. A composition suitable for forming refractory structures comprising a major quantity of zirconium oxide, 0.002 to 0.5 per cent of a water dispersible colloid and 0.002 to 0.5 per cent of a monohydroxyl base, such percentages being based on the weight of the zirconium oxide.

2. A composition suitable for forming refractory structures comprising a major quantity of zirconium oxide, with not more than 5 per cent of refractory oxides other than zirconium oxide, 0.002 to 0.5 per cent of a water dispersible colloid and 0.002 to 0.5 per cent of a monohydroxyl base, such percentages being based on the weight of the zirconium oxide.

3. A composition suitable for forming refractory structures comprising a major quantity of zirconium oxide, with not more than 5 per cent of refractory oxides melting above 2000° F. other than zirconium oxide, 0.002 to 0.5 per cent of a water dispersible colloid and 0.002 to 0.5 per cent of a monohydroxyl base, such percentages being based on the weight of the zirconium oxide.

4. A composition suitable for forming refractory structures comprising a major quantity of zirconium oxide, 0.002 to 0.5 per cent of a water dispersible colloid, 0.002 to 0.5 per cent of a monohydroxyl base, and water, such percentages being based on the weight of the zirconium oxide.

5. A composition suitable for forming refractory structures comprising a major quantity of zirconium oxide, with not more than 5 per cent of refractory oxides other than zirconium oxide, 0.002 to 0.5 per cent of a water dispersible colloid, 0.002 to 0.5 per cent of a monohydroxyl base, and water, such percentages being based on the weight of the zirconium oxide.

6. A composition suitable for forming refractory structures comprising a major quantity of zirconium oxide, with not more than 5 per cent of refractory oxides melting above 2000° F. other than zirconium oxide, 0.002 to 0.5 per cent of a water dispersible colloid, 0.002 to 0.5 per cent of a monohydroxyl base, and water, such percentages being based on the weight of the zirconium oxide.

7. A composition suitable for forming refractory structures comprising a major quantity of zirconium oxide, 0.002 to 0.5 per cent of a water dispersible colloid, 0.002 to 0.5 per cent of a monohydroxyl base, and 8 to 17 per cent water, such percentages being based on the weight of the zirconium oxide.

8. A composition suitable for forming refractory structures comprising a major quantity of zirconium oxide, with not more than 5 per cent of refractory oxides other than zirconium oxide, 0.002 to 0.5 per cent of a water dispersible colloid, 0.002 to 0.5 per cent of a monohydroxyl base, and 8 to 17 per cent water, such percentages being based on the weight of the zirconium oxide.

9. A composition suitable for forming refractory structures comprising a major quantity of zirconium oxide, with not more than 5 per cent of refractory oxides melting above 2000° F. other than zirconium oxide, 0.002 to 0.5 per cent of a water dispersible colloid, 0.002 to 0.5 per cent of a monohydroxyl base, and 8 to 17 per cent water, such percentages being based on the weight of the zirconium oxide.

EUGENE WAINER.